(12) United States Patent
Beckmann et al.

(10) Patent No.: US 9,342,334 B2
(45) Date of Patent: May 17, 2016

(54) SIMULATING VECTOR EXECUTION

(75) Inventors: Bradford M. Beckmann, Redmond, WA (US); Nilay Vaish, Madison, WI (US); Steven K. Reinhardt, Vancouver, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1000 days.

(21) Appl. No.: 13/530,793

(22) Filed: Jun. 22, 2012

(65) Prior Publication Data

US 2013/0346058 A1 Dec. 26, 2013

(51) Int. Cl.
*G06F 9/45* (2006.01)
*G06F 9/455* (2006.01)
*G06F 11/36* (2006.01)
*G06F 17/50* (2006.01)

(52) U.S. Cl.
CPC .......... *G06F 9/4552* (2013.01); *G06F 11/3644* (2013.01); *G06F 17/5022* (2013.01); *G06F 2217/86* (2013.01)

(58) Field of Classification Search
CPC .............. G06F 9/4552; G06F 17/5022; G06F 11/3644; G06F 2217/86
USPC .......................................... 703/22, 13; 712/7
See application file for complete search history.

(56) References Cited

U.S. PATENT DOCUMENTS

| | | | |
|---|---|---|---|
| 5,293,631 A | 3/1994 | Rau et al. | |
| 5,590,356 A * | 12/1996 | Gilbert | G06F 15/17337 712/22 |
| 7,543,119 B2 | 6/2009 | Hessel et al. | |
| 2004/0216094 A1 | 10/2004 | Bosworth et al. | |
| 2008/0059823 A1 | 3/2008 | Balatsos et al. | |
| 2008/0127059 A1 | 5/2008 | Eichenberger et al. | |
| 2008/0141012 A1 | 6/2008 | Yehia et al. | |
| 2008/0288754 A1 | 11/2008 | Gonion et al. | |
| 2009/0161763 A1 | 6/2009 | Rossignol et al. | |
| 2009/0300323 A1 | 12/2009 | Hessel et al. | |
| 2011/0069751 A1 | 3/2011 | Budagavi | |
| 2011/0320765 A1 | 12/2011 | Karkhanis et al. | |

(Continued)

OTHER PUBLICATIONS

Kerr, Andrew et al., "Dynamic Compilation of Data-Parallel Kernels for Vector Processors", Mar. 31-Apr. 4, 2012, ACM.*

(Continued)

*Primary Examiner* — Kamini S Shah
*Assistant Examiner* — Cedric D Johnson
(74) *Attorney, Agent, or Firm* — Rory D. Rankin; Meyertons, Hood, Kivlin, Kowert & Goetzel, P.C.

(57) ABSTRACT

A system and method for simulating new instructions without compiler support for the new instructions. A simulator detects a given region in code generated by a compiler. The given region may be a candidate for vectorization or may be a region already vectorized. In response to the detection, the simulator suspends execution of a time-based simulation. The simulator then serially executes the region for at least two iterations using a functional-based simulation and using instructions with operands which correspond to P or less lanes of single-instruction-multiple-data (SIMD) execution. The value P is a maximum number of lanes of SIMD exection supported both by the compiler. The simulator stores checkpoint state during the serial execution. In response to determining no inter-iteration memory dependencies exist, the simulator returns to the time-based simulation and resumes execution using N-wide vector instructions.

20 Claims, 6 Drawing Sheets

(56) References Cited

U.S. PATENT DOCUMENTS

2013/0086565 A1    4/2013  Gaster et al.
2013/0086566 A1*   4/2013  Gaster et al. .................. 717/148
2013/0107960 A1    5/2013  Ali

OTHER PUBLICATIONS

Meng, Jiayuan et al., "Dynamic Warp Subdivision for Integrated Branch and Memory Divergence Tolerance", Jun. 19-23, 2010, ACM.*
Rosenberg, Jonathan B. et al., "Mapping Massive SIMD Parallelism onto Vector Architectures for Simulation", Aug. 1989, Software-Practice and Experience, vol. 19(8), John Wiley & Sons, Ltd.*
Zhu, Jiafeng et al., "A Vectorization Method of Export Branch for SIMD Extension", 2011, 1th IEEE/ACIS International Conference on Computer and Information Science, IEEE Computer Society.*
Jiang, Xiaowei, "Architecture Support for Operating System Survivability and Efficient Bulk Memory Copying and Initialization", 2010, North Carolina State University.*
Meng, Jiayuan et al., "Robust SIMD: Dynamically Adapted SIMD Width and Multi-Threading Depth", 2012 IEEE 26th International Parallel and Distributed Processign Symposium, IEEE Computer Society.*
Kim, Dongkeun et al., "Design and Evaluation of Compiler Algorithms for Pre-Execution", 2002, ASPLOS X, ACM.*
Hampton, Mark et al., "Compiling for Vector-Thread Architectures", Apr. 5-10, 2008, CGO '08, ACM.*
Saponara, et al. "Data-Adaptive Motion Estimation Algorithm and VLSI Architecture Design for Low-Power Video Systems" Computers and Digital Techniques, IEE Proceedings; vol. 151 Issue: 1; Jan. 15, 2004; pp. 51-59.
Jung, et al. "A Dynamic Search Range Algorithm for Stabilized Reduction of Memory Traffic in Video Encoder" IEEE Transactions on Circuits and Systems for Video Technology, vol. 20, No. 7, Jul. 2010; pp. 1041-1046.
Ou, et al. "An Efficient VLSI Architecture for H.264 Variable Block Size Motion Estimation" IEEE Transactions on Consumer Electronics, vol. 51, No. 4, Nov. 2005, pp. 1291-1299.
Chen, et al. "Hardware Architecture Design of an H.264/AVC Video Codec" Asia and South Pacific Conference on Design Automation, 2006; Yokohama; Jan. 24-27, 2006; pp. 750-757.

* cited by examiner

SIMULATING VECTOR EXECUTION

BACKGROUND

1. Field of the Invention

This invention relates to computing systems, and more particularly, to simulating execution of instructions in a simulation environment.

2. Description of the Relevant Art

Modeling the behavior of a circuit or chip with a simulation tool is often helpful in product development. Consequently, simulation tools are in widespread use in industry and research communities. Generally speaking, simulation tools are used to validate digital logic and other designs prior to fabrication of the design. In many cases, the simulation tool may include both a functional mode and a timing mode. In addition, the simulation tool may provide a graphical user interface (GUI) for the user to interact with the simulation controls and the simulation results. Alternatively, a user may use text commands to interact with the tool and even use scripts to automatically send batch jobs to a server simulation environment.

In some cases, the simulation tool (or "simulator") may be used to estimate the effect on performance of new design techniques. Some of these techniques include adding new instructions or modifying existing instructions to take advantage of potential hardware design practices. One such technique is augmenting the instruction set architecture (ISA) to include wider and enhanced vector instructions. The performance of multimedia, scientific and financial applications depend on support for vector instructions such as single-instruction-multiple-data (SIMD) instructions. The hardware design modifications to support these wider vector instructions may include widening the SIMD register file, increasing the number of SIMD lanes in a datapath, modifying control logic to increase the number of supported operands in an instruction, and modifying the memory bus architecture as just some potential examples.

The modifications of the hardware offering on-chip enhancements may not be completed until simulations have provided results indicating which modifications provide the desired performance or characteristics. While simulators may be used to analyze various hardware modifications, compilers are typically not enhanced to support such modifications until the hardware design is available. Unfortunately, not having such a compiler available can make developing and validating new hardware digital logic design with a simulator more difficult. One solution is to add new instructions to the ISA without having simulations to accurately estimate the effects of including such instructions. Disadvantages of this approach include unforeseen side effects, such as memory or other bottlenecks being added to the design, which may necessitate expensive post-silicon redesign. For example, wider vector instructions may encounter bandwidth bottlenecks which were not encountered by previous vector instructions. Additionally, a new feature such as support for scatter/gather memory accesses may result in unforeseen long latencies due to the added complexity.

In view of the above, efficient methods and systems for simulating new instructions without compiler support for the new instructions are desired.

SUMMARY OF EMBODIMENTS

Systems and methods for simulating new instructions without compiler support for the new instructions are contemplated.

In various embodiments, a simulator includes at least a functional unit, a timing unit, and a vectorization unit. The functional unit may include functional simulation instructions for modeling the functionality of executing instructions in a given instruction set architecture (ISA). The timing unit may include timing simulation instructions for modeling the timing of executing instructions in the given ISA. The timing-based simulation instructions may provide cycle accurate behavior of processing the instructions of the given ISA. The vectorization unit may include vectorization instructions for processing particular regions of program code generated by a compiler. In various embodiments, the compiler may support P-wide vector instructions, where each P-wide vector instruction includes operands corresponding to P lanes of single-instruction-multiple-data (SIMD) execution. The compiler may support the generation of both scalar instructions (instructions including operands corresponding to a single data lane of execution) and the generation of P-wide vector instructions.

In some embodiments, the compiler is configured to identify a region of instructions within source code as being a candidate region for vectorization. For example, the candidate region may be a loop within the source code. The compiler may determine that some level of vectorization of the region of code may be possible. For example, it may be determined that a particular number of iterations of the loop do not have memory dependencies for a number of iterations equal to P, where P is the number of lanes of SIMD execution supported by a target hardware platform. In various embodiments, rather than translate the scalar instructions within the body of the loop to P-wide vector instructions, the compiler may mark the region with a given indication recognizable by the simulator. In other embodiments, the compiler may translate the scalar instructions to P-wide vector instructions. In some embodiments, the P-wide vector instructions (opcodes) themselves may indicate a vectorized region to the simulator. Various approaches for indicating a vectorized or vectorizable region are possible and are contemplated.

In response to detecting a vectorized or vectorizable region, the vectorization unit of the simulator suspends execution of a time-based simulation provided by the timing unit. In addition, the vectorization unit serially executes the region for at least two iterations using a functional-based simulation and M-wide vector instructions, wherein $1 \leq M \leq P$. Therefore, the simulator serially executes the region with scalar instructions or serially executes the region with vector instructions with a width no wider than P. The number of iterations times M equals N, wherein $N > P$. The value N is a width of wider vector instructions to simulate. In various embodiments, the N-wide vector instructions may not be supported by the compiler. During serial execution, the vectorization unit may store each checkpoint state generated between iterations of the at least two iterations. The vectorization unit may store the generated checkpoints in a data structure separate from a simulated memory image. In response to determining no memory dependencies exist within any two iterations of the at least two iterations, the vectorization unit switches execution from the functional-based simulation to the time-based simulation. In addition, the vectorization unit directs the timing unit to execute in parallel the region using N-wide vector instructions.

These and other embodiments will be further appreciated upon reference to the following description and drawings.

Figure 1:
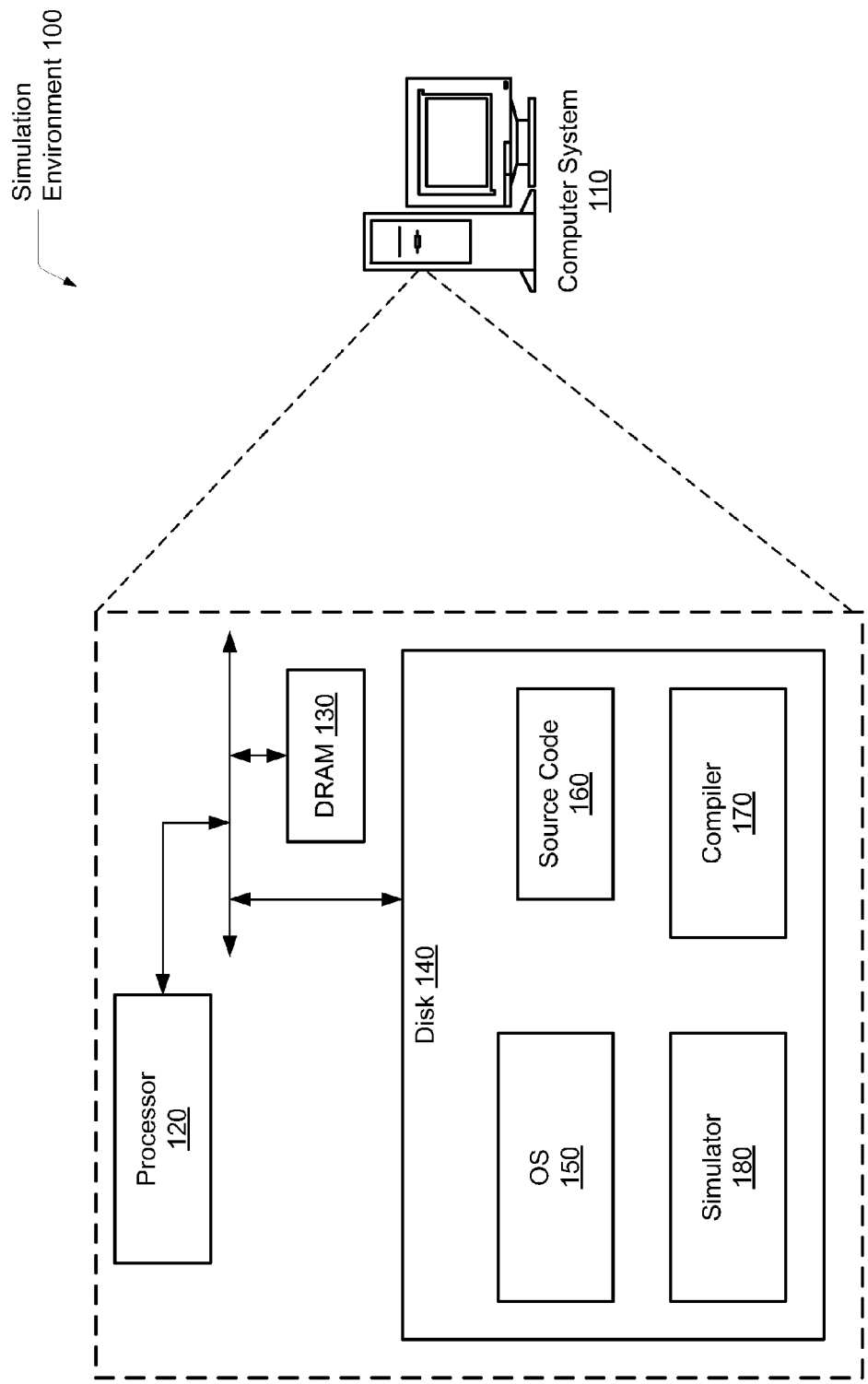
FIG. 1 is a generalized block diagram of one embodiment of a simulation environment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Turning to FIG. 1, a generalized block diagram of one embodiment of a simulation environment 100 is shown. In one embodiment, the simulation environment 100 includes a computer system 110 that stores and executes software for modeling the behavior of a given system or chip. The computer system 110 may use a simulation tool, which may also be referred to as a "simulator". For example, the computer system 110 may store instructions of simulator 180 on disk memory 140. The simulator 180 may model the behavior of one or more processors, systems, or components, used to execute code generated by the compiler 170. For example, the compiler 170 may translate the source code 160 to binary code which is then accessed by the simulator 180. In various embodiments, the compiler 180 is configured to support vector instructions of width P, and the simulator is configured to support vector instructions of width N, where N>P. Generally speaking, a vector instruction is an instruction which may operate on multiple data values or operands—such as an array of values. Such data values may be integer, floating point, bit vectors, or otherwise. In contrast, scalar instructions are instructions which operate on a single data value. Vector instructions are often used in scientific or graphics oriented computations where an operation may be repeatedly applied to numerous data values. It is noted that while the simulator is described herein as software, in various embodiments a simulator may comprise be either software, hardware, or any suitable combination of the two. For example, in some embodiments the simulator may be a hardware emulator. The hardware emulator may be special-purpose hardware system used to emulate a particular piece of hardware, such as a semiconductor chip. The emulator may be coupled to a working target system in place of a semiconductor chip being designed. All such embodiments are contemplated.

The computer system 110 may include at least processor 120 to execute instructions of software applications stored on disk 140, including the simulator 180. The instructions of software applications may also be stored on the dynamic random access memory (DRAM) 130 and one or more levels of a cache subsystem (not shown). As shown, the software applications stored on disk 140 may include at least an operating system (OS) 150, the source code 160, the compiler 170 and the simulator 180. The computer system 110 may also include one or more peripheral devices.

Although the simulation environment 100 is shown within the single computer system 110, in other embodiments one or more of the source code 160, the compiler 170 and the simulator 180 may be stored and executed on separate computer systems. The separate computer systems may be connected through data transfer links. In some embodiments, the computer system 110 may be used as a client or server computer in a network architecture. The system 110 may be connected to multiple simulation servers through data transfer links used within an Ethernet connection, a wide area network (WAN), such as the Internet, or another selected network protocol.

Generally, the processor 120 accesses a cache memory subsystem for data and instructions. If the requested block is not found in the cache memory subsystem, then a read request may be generated and transmitted to a memory channel controller. The off-chip memory may include the DRAM 130 and the disk 140. The disk 140 may include a hard disk drive (HDD), a solid-state disk drive, or other non-volatile memory technology. The disk 140 may store an operating system (OS) 150, one or more source applications, such as source code 160, the simulator 180, and one or more compilers such as compiler 170.

In various embodiments, the OS 150 may be any of various operating systems. The operating system may interface between the system hardware and the software applications. Although only a single compiler is shown, the disk 140 may store multiple compilers. The compiler 170 may translate source code, such as the source code 160, into another computer language, or target code. The source code may be software applications written by a designer in a high-level language such as C, C++, Fortran, or other. The target code may be machine code or an intermediate representation. Machine code is a general term that refers to patterns of bits with different patterns corresponding to different commands, or instructions, to the machine, or processor, and to the operating system. The machine code may also be referred to as binary code.

Compiler 170 may be split into a number of relatively independent phases. One phase may perform syntactic and semantic processing and translates the source code to a lower-level representation. Another phase may perform optimizations on the lower-level representation. The compiler 170 may perform analysis, transformations, and optimizations for a particular hardware platform. For example, a target hardware platform may support SIMD vector extension instructions by including SIMD hardware. Additionally, the manner in which to compile the software application in order to achieve peak performance may vary between a single-core processor, a multi-core processor, and a multi-die product such as a system-on-chip (SOC).

For an architecture supporting SIMD extension instructions, the SIMD hardware may include one or more vector units of a given width, wherein the width determines a number of SIMD lanes available for data processing in a given vector unit. Each SIMD lane may be capable of executing in parallel a same instruction as another lane but with different data. In one embodiment, the vector units are integrated in a general-purpose processor core, such as being grouped with a floating-point unit. In another embodiment, the vector units may be located in a graphics processing unit (GPU) integrated on a same die as a general-purpose central processing unit (CPU). Vector units may also be incorporated in special purpose hardware.

The compiler 170 may be configured to identify loops with an iteration count that can be determined at the time of compilation. In addition to identifying such loops, the compiler 170 may analyze cross-iteration memory dependencies for a given number of loop iterations to be executed in parallel by SIMD vector units. The given number of loop iterations may correspond to a width of vector instruction supported by the compiler. For example, the compiler may support vector instructions with P lanes of SIMD execution, wherein P is an integer. In one embodiment, target hardware may support 4-wide vector units (4 lanes of SIMD execution) and the compiler may support generation of vector instructions with a width of 4.

For research and design enhancement purposes, an engineer may wish to simulate enhanced vector instructions that the compiler 170 does not yet support. As described earlier, the enhanced vector instructions may include wider vectors (an increased number of data operands corresponding to an increased number of lanes of SIMD execution), an increased number of supported data types, a relaxed alignment of SIMD memory operands, unrestricted memory accesses supporting gather/scatter capabilities, and so forth. Thus, the simulator 180 may execute the resulting code in a different manner in order to execute the enhanced wider vector instructions that do not appear in the generated binary code.

In various embodiments, a user may use a scripting language to automate the generation and sending of batch jobs from a client computer to one or more simulation servers. The user may also use the script language to collect and organize results from the executed simulations. The simulations performed by the simulator 180 may include changes to various system components in order to analyze performance and/or power and area efficiency. The changes may apply to various system components such as an instruction set architecture (ISA), a memory subsystem, queue sizes, a cache coherency protocol and selected memory hierarchy, a number of processors, and so forth. Whether the simulations are performed on the single computer system 110, multiple computer systems, or on a server network architecture, simulating potential improvements to a computing system may be a compute-intensive and iterative process.

The simulator 180 may include instructions for modeling the behavior of a processor microarchitecture and additionally a surrounding subsystem, such as a memory subsystem and one or more peripheral devices. The simulator may also model the behavior of multiple processor cores within a system. In such systems, one or more cores may have a homogeneous microarchitecture. In other systems, one or more additional cores may have a heterogeneous microarchitecture.

In one embodiment, the simulator 180 may be an event-driven, reconfigurable simulator used to project the performance of different benchmarks and workloads on one or more architectures under investigation in a computing system. The simulator 180 may include functional simulation instructions within a functional unit for modeling the functional behavior of components within a given processor microarchitecture and the subsystems surrounding the given processor. The simulator 180 may utilize an object-oriented or other paradigm for modeling various components. The simulator 180 may model the execution of data-parallel applications that operate with different memory subsystems. For example, in some embodiments, the simulator 180 may model a multi-core architecture operating with a directory-based cache hierarchy.

In addition to the above, the simulator 180 may include timing simulation instructions within a timing unit for modeling the latencies of components and operations within the given processor and the surrounding subsystems. In various embodiments, the timing simulation instructions provide cycle-accurate timing for latencies of components and events. In one embodiment, the simulator 180 is based on the MV5 simulator. Alternatively, the simulator 180 may be based on other selected simulators such as PTLsim, SESC, SimICS, SimFlex, or any other selected simulator.

Workloads that are simulated may include instruction-level parallelism (ILP), data-level parallelism (DLP), and thread-level parallelism. There is an increasing demand for processors that support multimedia, scientific and financial applications. These applications may depend on on-chip single-instruction-multiple-data (SIMD) capability and corresponding vector instructions that take advantage of data-level parallelism. As noted above, these vector instructions may be included in a "for" loop, a "while" loop, or another parallel construct within source code. In various embodiments, a compiler may identify and analyze parallel constructs, such as loops, and replace them with a method or a function call defined in a parallelization library. Some of the analysis performed by a compiler may include determining whether cross-iteration memory dependencies exist for a given number of loop iterations to be executed in parallel by SIMD vector units. These parallel constructs may take advantage of instruction-level parallelism, whereas the vector instructions executed by SIMD vector units take advantage of data-level parallelism. These parallel constructs, such as loops, that are found to utilize SIMD vector instructions due to no inter-iteration memory dependencies for a given number of iterations may also be referred to vectorized (or vectorizable) regions.

The vector instructions may be enhanced in next-generation processors to include wider vectors (an increased number of data operands corresponding to more lanes of SIMD execution), an increased number of supported data types, a relaxed alignment of SIMD memory operands, unrestricted memory accesses supporting gather/scatter capabilities, and so forth. While the effects of the enhancements may include performance benefits in particular areas of a computing system, the effects may also include performance degradation in other areas. Simulation can be used to help identify these different effects.

As described earlier, the simulator 180 may be configured to perform both functional and timing based simulation A vectorization unit within the simulator 180 may be used to interrupt the flow of a simulation in order to model the behavior of enhanced vector instructions. The vectorization unit may direct a manner in which each of the functional-based simulation and the timing-based simulation is used in response to simulating enhanced wider vector instructions that are not supported by the compiler 170.

In one embodiment, a loop within the source code 160 may have no inter-iteration memory dependencies for a given number of iterations. In various embodiments, this number of iterations is equal to P, where P is the number of lanes of SIMD execution directly supported by instructions generated by the compiler (e.g., the compiler supports generation of P wide SIMD instructions). The compiler 170 may detect this type of loop and mark the loop as a vectorizable region. In another embodiment, a designer writing the source code 160 may insert pragmas or other identifiers to mark the loop as a vectorizable region that is intended to utilize enhanced wider vector instructions. In yet other embodiments, the compiler 170 may vectorize the loop by translating scalar instructions within the body of the loop to P-wide vector instructions.

The simulator 180 may receive or otherwise access code generated by the compiler 170. The code generated by the compiler may be binary code or other code suitable for processing by the simulator 180. In response to detecting a vectorizable region or a region that has been vectorized in the code during a timing based simulation, the simulator 180 may suspend execution of the timing-based simulation. The simulator 180 may then serially execute the region for at least two iterations using a functional-based simulation and M-wide vector instructions, wherein 1≤M≤P. In other words, the simulator functionally executes the region with scalar instructions or vector instructions with a width no wider than P. A scalar instruction may be executed by a single-lane implementation of the vector units, or a unit or a module within a general-purpose arithmetic logic unit (ALU). In various embodiments, the number of iterations of serial execution times M is equal to N, wherein N>P. For example, if the number of iterations is 2 and M=4, then N=8. The value N is a width of a new wider vector instruction to simulate. As noted above, this N-wide vector instruction may not be directly supported by the compiler 170. After each iteration, state data (or a "checkpoint") may be stored. Subsequently, a qualifying condition may be tested to determine whether the timing-based simulation may restart using the generated checkpoint data. The qualifying condition may be a determination as to whether any memory dependencies exist between any two iterations of the N iterations.

In response to determining no memory dependencies exist between any two iterations of the N iterations, the simulator 180 may restart the timing-based simulation and re-execute the loop using modeled N-wide vector units and using the stored checkpoints (discussed in greater detail below).

Figure 2:
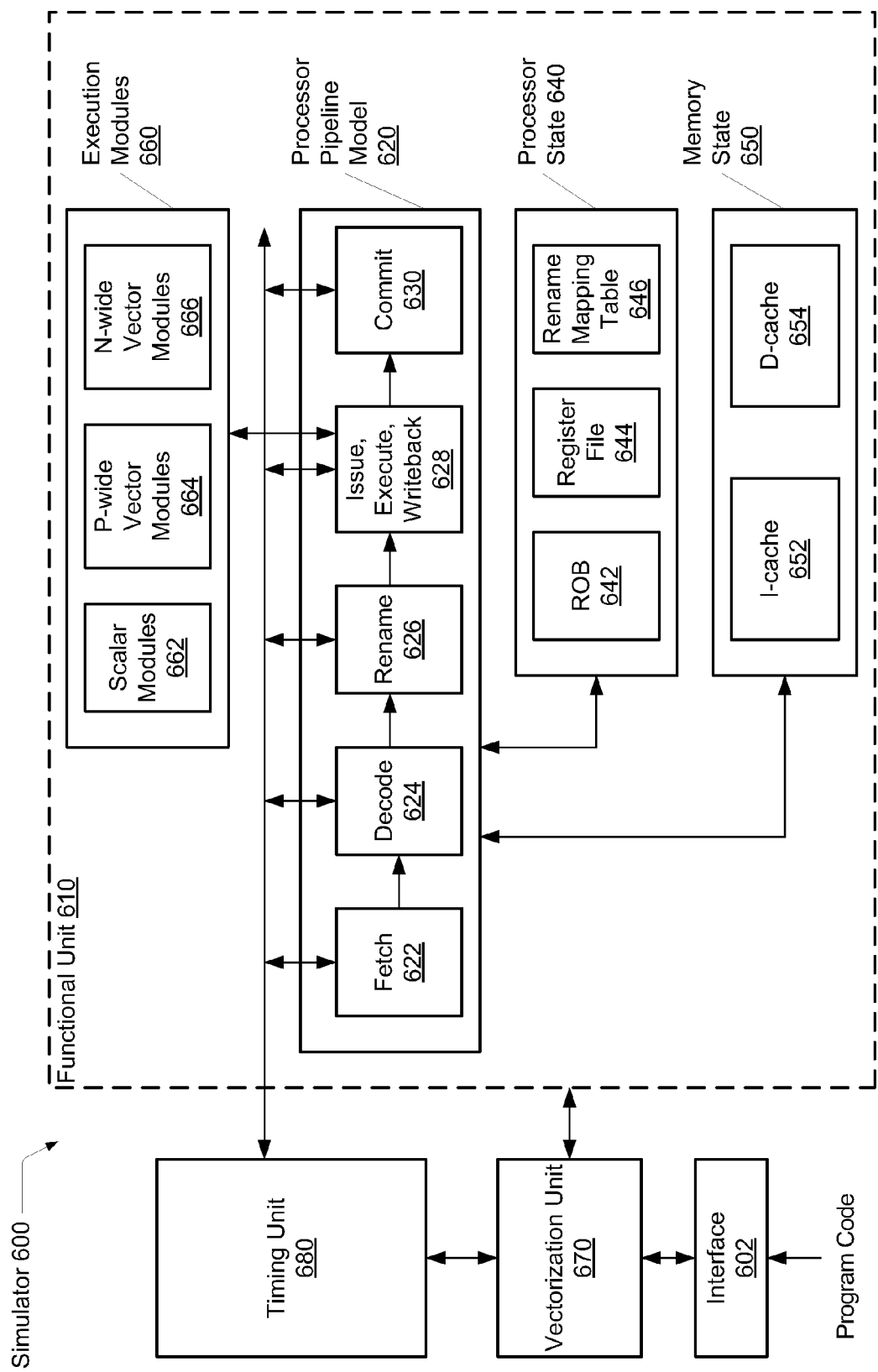
FIG. 2 is a generalized block diagram of one embodiment of a simulator.

Turning now to FIG. 2, a generalized block diagram illustrating one embodiment of a simulator 600 is shown. As shown, the simulator 600 includes a functional unit 610, timing unit 680, vectorization unit 670, and interface 602. While distinct units are described, it is noted that that software (and/or hardware) associated with a described unit's functionality may in fact be distributed throughout the simulator 600 in other ways. In the example show, the functional unit 610 may provide a functional-based simulation of the behavior of a semiconductor chip. The semiconductor chip may be a microprocessor with one or more processor cores, a system-on-chip (SOC), and so forth. The functional unit 610 may an event-based or a transaction-based model of the chip. The timing unit 680 may provide for timing-based simulation of the behavior of the chip. The timing unit 680 may be a cycle-accurate model of the chip.

In one embodiment, an interface 602 may receive program code and provide it to the functional unit 610 and the timing unit 680. In various embodiments, the program code is binary code generated by a compiler. The vectorization unit 670 may inspect the received program code and detect one or more regions in the code that are already vectorized or are candidates for vectorization. In response to these detections, the vectorization unit 670 may alter the flow of the simulation as described below.

The functional unit 610 may include a processor pipeline model 620. Although a single pipeline model is shown, in various embodiments, the simulator 600 may include multiple pipeline models to simulate the behavior of multiple processor cores. In the embodiment shown, a five-stage pipeline is used for ease of illustration. However, additional pipeline stages may be used. The pipeline model 620 may include a fetch stage 622, a decode stage 624, a rename stage 626, a combined stage 628 with instruction issue, execute, and writeback; and a commit stage 630.

In some embodiments, each of the pipeline stages includes configurable modules 660. In one example, an execute pipeline stage may include scalar modules 662, P-wide vector modules, and N-wide vector modules 666. The scalar modules 662 may execute scalar instructions. The P-wide vector modules 664 may execute P-wide vector instructions with data operands that correspond to P lanes of SIMD execution. The value of P may be a maximum width for vector instructions that is supported by a compiler. The N-wide vector modules 666 may execute N-wide vector instructions with data operands that correspond to N lanes of SIMD execution. The value N may be a width of a new wider vector instruction to simulate. The compiler may not yet support the N-wide vector instructions.

The timing unit 680 may be used to vary the latencies of the pipeline stages and modules within the pipeline stages. In addition, the timing unit 680 may characterize the latencies for accesses to processor state 640 and memory state 650. The processor state 640 may include a reorder buffer (ROB) 642, a physical register file 644, and a rename mapping table 646. In various embodiments, the processor state 640 may include other modules such as a load/store queue (LSQ), a store buffer, an instruction queue, a scheduler or reservation stations, and so forth.

The memory state 650 may include at least an instruction cache (i-cache) 652 and a data cache (d-cache) 654. Each of the caches 652 and 654 may include one or more levels of memory hierarchy. In addition, one or more levels of the caches 652 and 654 may be shared. One of several cache coherence protocols may be modeled in the modules corresponding to the caches 652 and 654. The vectorization unit 670 may monitor the received program code and control the flow of simulation based on the program code. These steps are further described below.

Figure 3:
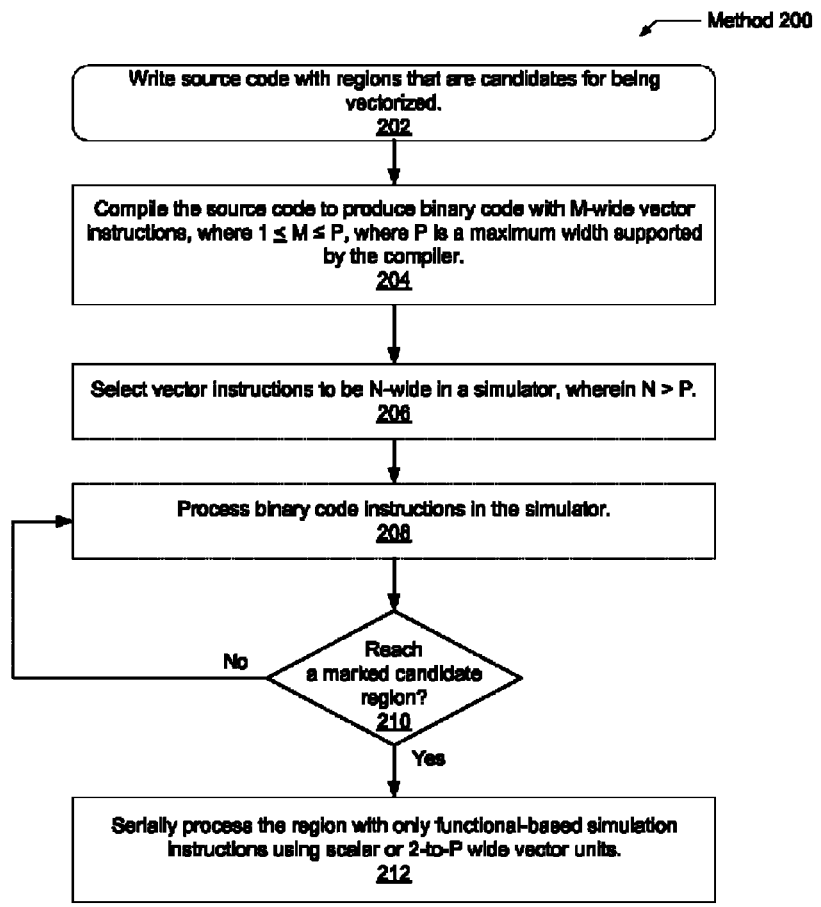
FIG. 3 is a generalized flow diagram of one embodiment of a method for split simulating new vector instructions without compiler support for the new vector instructions.

Turning now to FIG. 3, a generalized flow diagram of one embodiment of a method 200 for a first half of split simulating new vector instructions without compiler support for the new vector instructions is shown. In block 202, a designer writes source code, where the source code includes vectorized regions or candidate regions for being vectorized. These regions may, for example, include a "for" loop, a "while" loop, or another parallel construct where instructions may be executed with vector extension instructions. The regions may be able to utilize P-wide vector instructions, wherein P is an integer. Each P-wide vector instruction may include operands corresponding to P lanes of single-instruction-multiple-data (SIMD) execution.

The following example gives a simplified view of a candidate region for vectorizing within source code. A designer may write source code that contains the below code segment now present in a lower-level representation following compilation,

```
Annotation ("loop starts here and ends at label L1");
    for (i = 1; i <= N; i++) {
        A[i] = A[i] * B[i];
        if (A[i] == 0)
            A[i] = A[i] + C[i];
        else
            A[i] = A[i] - C[i];
    }
L1:
```

In block 204, a compiler may translate the source code to binary code. The compiler may support P-wide vector instructions. For example, the compiler may support 4-wide vector extension instructions. In one embodiment, the designer annotates the candidate regions for vectorizing while writing the source code. In another embodiment, the compiler identifies the candidate regions. The compiler may insert markings of a beginning and an end of a vectorized region or a candidate region for vectorizing. The simulator may understand these markings, but the markings may not be binary encodings that actual hardware is able to process. Rather, the markings indicate to the simulator that a region of code is to be processed in a different manner.

A designer or a compiler may produce the beginning and the end markings for regions that are candidates for vectorizing. Thus, memory dependencies may occur within parallel execution of an N-wide vector extension instruction, wherein N is greater than P. For example, a new enhanced vector instruction may have operands corresponding to a width of 16 SIMD lanes, whereas the compiler supports a 4-wide vector instruction. In this example, the compiler does not check for memory dependencies beyond 4 lanes of parallel SIMD execution. A designer may not accurately identify memory dependencies within the source code, especially if the source code is executed on different data sets. As described shortly, the simulator may perform checks for any memory dependencies within N lanes of parallel SIMD execution.

In one embodiment, within the marked region, the compiler may be directed to generate binary code for scalar instructions. In another embodiment, within the marked regions, the compiler may be directed to generate binary code for compiler-supported P-wide vector instructions. In yet another embodiment, within the marked regions, the compiler may be directed to generate binary code for M-wide vector instructions, wherein 1≤M≤P. In such embodiments, the compiler supports multiple widths for vector instructions. The scalar instructions may provide more flexibility in later selecting a new width for enhanced vector instructions to simulate. The new width, N, may be any multiple of one. The new width N is greater than the compiler-supported width, P. However, if the compiler generates binary code for compiler-supported P-wide vector instructions, then the new width, N, may be a multiple of P. Similarly, if the compiler generates binary code for M-wide vector instructions, then the new width, N, may be a multiple of M.

In block 206, the new width for enhanced vector instructions may be selected. The width N is greater than P, the compiler-supported width. In one embodiment, the new width N is programmable and it is automatically selected and passed to the simulator by an automated script. In another embodiment, the new width N is entered at a command line prompt. In block 208, the binary code is received by the simulator and processed by the simulator.

If the simulator reaches a marked candidate region (conditional block 210), then in block 212, the simulator may suspend execution of the timing simulation instructions. In addition, in one embodiment, the simulator may serially execute for at least two iterations functional simulation instructions. The number of iterations times the current width of the vector instructions within the region may equal N. For example, if the compiler generates scalar instructions within the marked region, then the number of iterations may equal N. If the compiler generates 4-wide vector instructions within the marked region, then the number of iterations may equal N/4. If the loop index count is greater than N, then the serial execution of these instructions may occur in groups, wherein each group includes N/(size-of-instruction-width) iterations, such as each group includes N/4 iterations as in the above example. If the loop index count is equal to N, then there may be a single group of N/(size-of-instruction-width) iterations.

The earlier example of a candidate region for vectorizing is shown here again. This example of a candidate region is used to describe the redirecting of a simulation by a simulator when such a region is detected. A designer may write source code that contains the below code segment now present in a lower-level representation following compilation,

```
Annotation ("loop starts here and ends at label L1");
    for (i = 1; i <= N; i++) {
        A[i] = A[i] * B[i];
        if (A[i] == 0)
            A[i] = A[i] + C[i];
        else
            A[i] = A[i] – C[i];
    }
L1:
```

Figure 4:
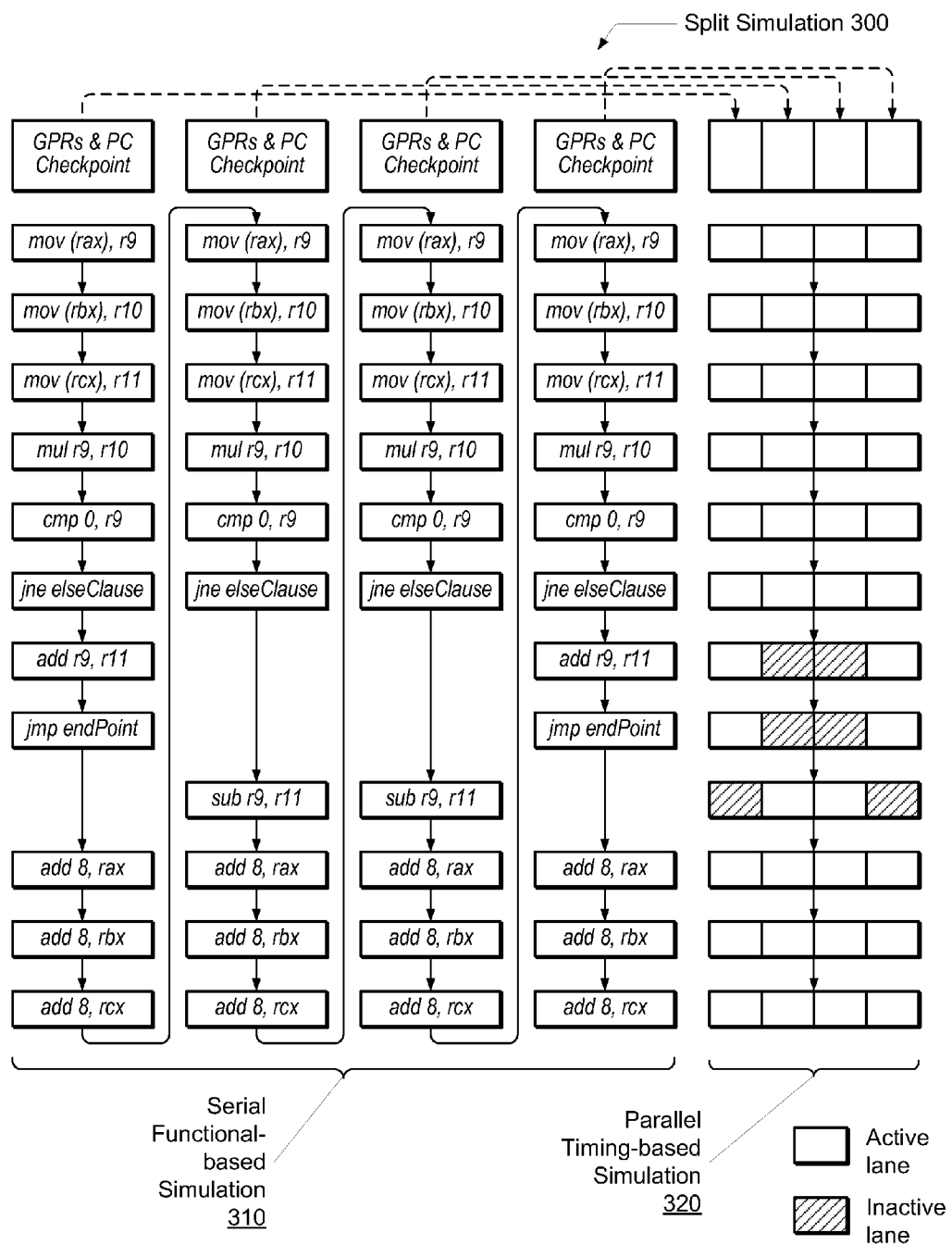
FIG. 4 is a generalized block diagram of one embodiment of a split simulation.

Referring now to FIG. 4, a generalized block diagram of one embodiment of split simulation 300 is shown. The split simulation 300 may illustrate the processing performed by the simulator for an identified region for vectorizing, such as the above code example. The split simulation 300 may be used to estimate the performance implications of new enhanced wider vector instructions before compilers support such instructions. Additionally, without the aid of detailed compiler analysis, the split simulation 300 may determine when a loop cannot be vectorized.

As shown, each iteration of the instructions within the above marked region example may be translated to three move instructions acting as load instructions followed by a multiplication instruction. A comparison instruction comparing the contents of register r9 to zero is used followed by a conditional jump instruction. An addition or a subtraction instruction may be performed based on the conditional jump followed by addition instructions used to move pointer values. The serial functional execution 310 illustrates the serial execution of 4 iterations of the loop. For the first and the fourth serial iterations, the if-statement is satisfied and the addition instruction is executed. For the second and the third serial iterations, the if-statement is not satisfied and the subtraction instruction is executed. Scalar modules within the simulator may be used to provide the functionality of the instructions. A timing-based simulation may be suspended during the serial functional-based simulation.

The simulator may create a data structure separate from a simulation memory image to store the processor register state as a checkpoint for each iteration of the serial execution. These register checkpoints may serve as a register input state for both an iteration during the serial functional-based execution and a later parallel timing-based execution of the same loop. In other words, the individual register checkpoints may be used as inputs to parallel SIMD lanes of a N-wide vector unit model. The parallel timing-based simulation 320 illustrates the parallel execution of the four iterations of the loop. In this example, a 4-wide vector unit module within the simulator may be used to provide the timing of the instructions.

Figure 5:
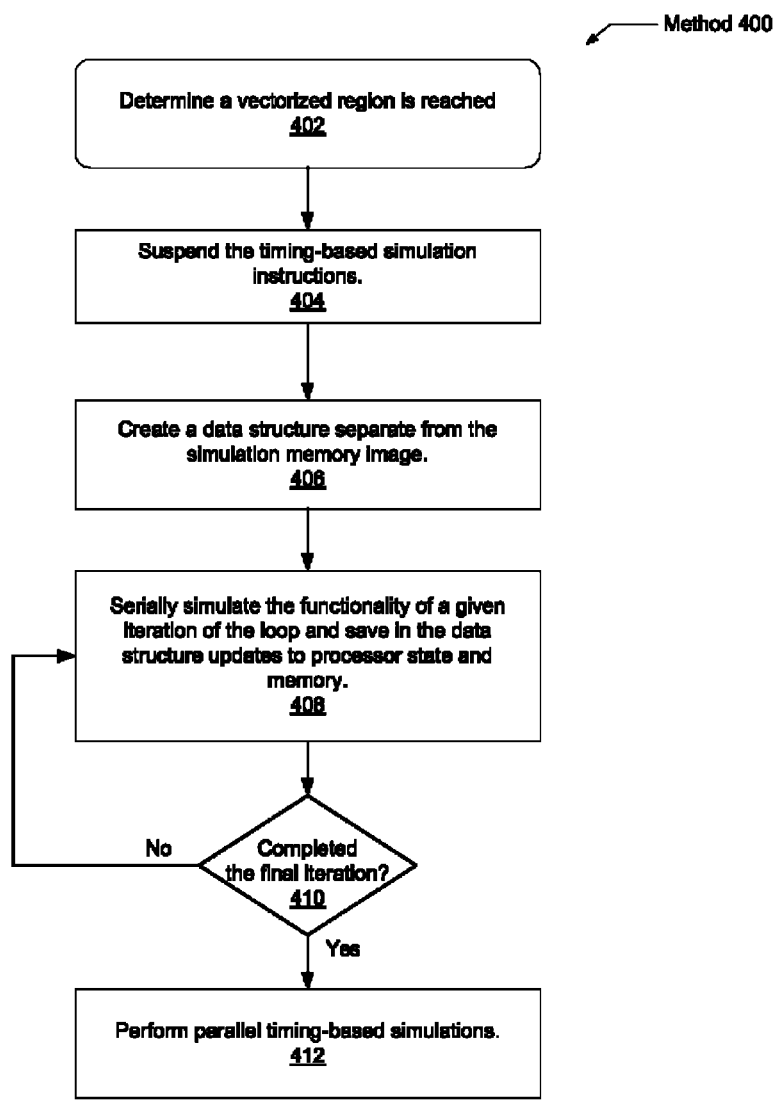
FIG. 5 is a generalized flow diagram of one embodiment of a method for serialized functional-based simulation of a region of code.

Turning now to FIG. 5, a generalized flow diagram illustrating one embodiment of a method 400 for serialized functional-based simulation of a region of code is shown. In block 402, the simulator determines a vectorized region or a candidate region for vectorizing is reached within binary code. Annotations from either a designer or a compiler may be used to identify the region. A vectorized region includes vector instructions and the vector instructions may provide the indication of a vectorized region. In block 404, the simulator suspends the timing-based simulation instructions. This suspension effectively suspends the advancement of simulated time. In block 406, the simulator creates a data structure separate from the simulation memory image for storing processor state and memory updates during serial functional-based simulation. The serial functional-based simulation does not modify the simulated memory image. The stored updates that would occur to the processor state and memory may be used to verify no cross-iteration memory dependencies occur within the N iterations of the marked or identified region.

In block 408, the simulator serially simulates the functionality of a given one of at least two iterations of the loop. The number of iterations times the vector width of the instructions within the region may equal N. The value N is selected as the targeted width of new enhanced wider vector extension instructions and corresponding new enhanced wider vector units. During the serial functional-based simulation of the given iteration, the simulator saves updates to processor state and memory in the created data structure. Since the timing-based simulation is suspended, the serial functional-based simulation of the instructions appears to execute instantaneously with respect to the simulated time. If the simulator completes the final iteration (conditional block 410), then in block 412, the simulator performs parallel timing-based simulations. In one embodiment, the simulator performs the parallel execution in response to determining no memory dependencies exist among the at least two serial iterations. In other embodiments, the simulator sends an indication that memory dependencies exist. Afterward, the simulator may still perform the parallel execution. Further details are provided below.

Figure 6:
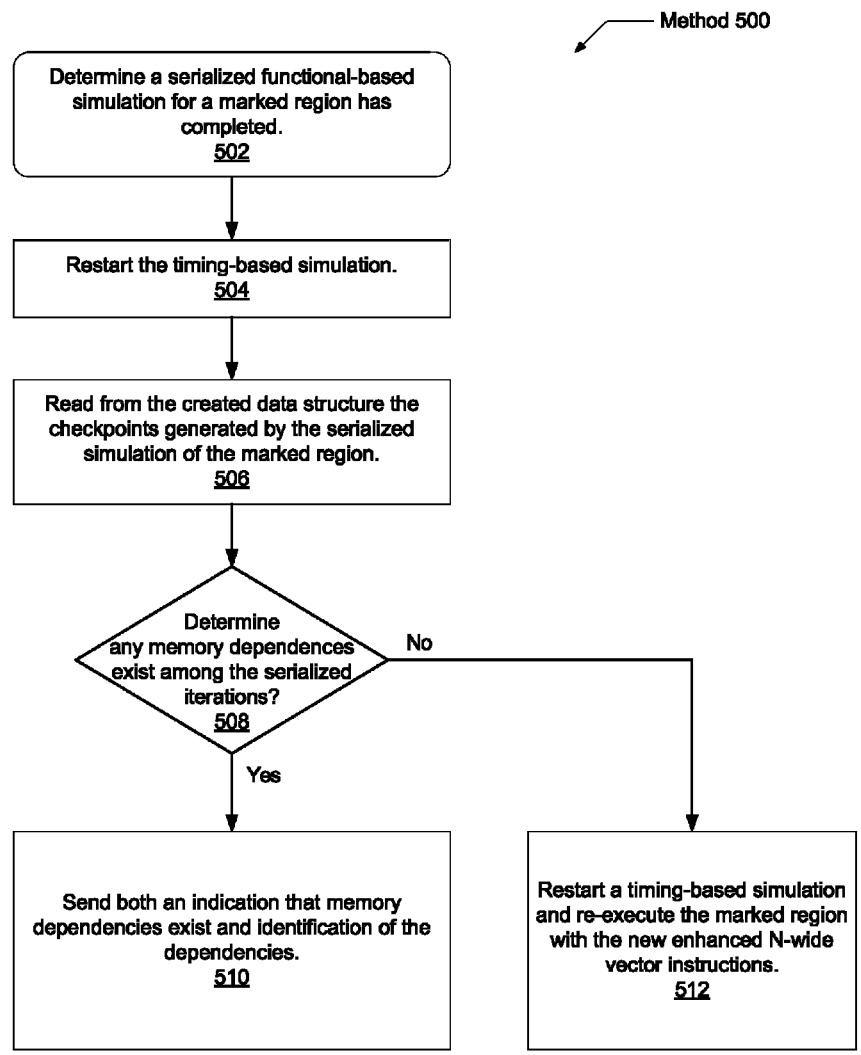
FIG. 6 is a generalized flow diagram of one embodiment of a method for restarting a timing-based simulation of a marked region with new vector instructions.

Turning now to FIG. 6, a generalized flow diagram one embodiment of a method 500 for restarting a timing-based simulation of a marked region with new vector instructions is shown. Similar to methods 200 and 400, method 500 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment.

In block 502, the simulator determines a serialized functional-based simulation for a marked region has completed. In block 504, the simulator restarts the timing-based simulation instructions. In block 506, the simulator reads from the previously created data structure the checkpoints (updates to processor state and memory) generated by the serialized iterations of the marked region. If the simulator determines any memory dependencies exist among the serial iterations (conditional block 508), then this particular marked region may not qualify to be vectorized with the new enhanced N-wide vector units. In block 510, the simulator may send to a designer both an indication that memory dependencies exist and identification of the dependencies. In one embodiment, the simulator writes the indication and the identification information in a given file. In another embodiment, the simulator displays the indication and the identification information on a computer screen at a prompt command line or within a graphical user interface (GUI).

A user or designer may verify whether the identified memory dependencies are true dependencies and thus whether the enhanced N-wide vector instructions may be used to process the marked region. Afterward, in one embodiment, the simulator may terminate the simulation. In another embodiment, the simulator may continue to re-execute the marked region with the enhanced N-wide vector units in a timing-based simulation. In yet another embodiment, the simulator may re-execute the marked region with compiler-supported P-wide vector instructions. Again, the timing simulation instructions are enabled. Additionally, the simulator updates the simulation memory image and internal registers during the re-execution.

If the simulator determines no memory dependencies exist among the serial iterations (conditional block 508), then this particular marked region may be vectorized with the new enhanced N-wide vector units. In block 512, the simulator re-executes the iterations of the loop with the new enhanced N-wide vector instructions modeled in a N-wide vector unit module. Again, the timing-based simulation instructions are restarted. Additionally, the simulator updates the simulation memory image and internal registers during the re-execution. During the re-execution, a given SIMD lane of the N lanes is executed for a given instruction if the given lane has an associated program counter (PC) with a minimum value among the PCs across the N lanes. Thus, the simulator supports predicated vector execution where particular lanes may be active while other lanes are inactive.

Referring again to FIG. 3, the parallel timing-based simulation 320 has active lanes and inactive lanes. For the first addition instruction, the active lanes (first and fourth lanes) have an associated PC that is a minimum value of the PCs across the four lanes. Two instructions later, for the subtraction instruction, the second and third lanes among the four lanes have an associated PC that is a minimum value of the PCs across the four lanes. Therefore, the second and the third lanes are active lanes, whereas the first and the fourth lanes are inactive lanes. During the parallel timing-based simulation 320, the simulator may issue N parallel memory requests. Each of the N parallel memory requests may target an arbitrary address. Thus, the simulator supports the behavior of gather/scatter vector instructions without the compiler generating them.

The above description and the steps for methods 200, 400 and 500 may be modified to extend to nested loops and function calls within vectorized regions. For example, by separately tracking forward and backward branches in separate stacks, the simulator may execute a nested vectorized region by executing each lane (including forward branches) until each lane reaches a backwards branch, which returns to the beginning of a next inner iteration. In addition, in order to support function calls, the simulator may use a stack to store checkpoints for each SIMD lane of the N-wide vector unit. Each lane may use a separate stack frame after entering a function call.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LP-DDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool, which may synthesize the description to produce a netlist comprising a list of gates from a synthesis library. The netlist comprises a set of gates, which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
    an interface configured to receive program code, wherein the program code includes one or more instructions that are vectorizable or have been vectorized, wherein a vectorized instruction is a P-wide vector instruction including operands which correspond to P lanes of single-instruction-multiple -data (SIMD) execution;
    a vectorization unit; and
    a processor configured to:
        perform a time-based simulation of instructions of the program code;
        suspend execution of the time-based simulation, in response to detecting a region of vectorized or vectorizable instructions in the program code;
        switch to a functional-based simulation of instructions of the program code and serially execute instructions in the region for at least two iterations using the functional-based simulation;
        store each checkpoint state generated between iterations of the at least two iterations; and
        resume the time-based simulation, in response to determining no memory dependencies exist within any two iterations of the at least two iterations.

2. The computing system as recited in claim 1, wherein in response to determining said memory dependencies do not exist, the processor is configured to execute instructions of the region using N-wide vector instructions, wherein N >P, as part of the resumed time-based simulation.

3. The computing system as recited in claim 2, wherein the processor is further configured to utilize data corresponding to the generated checkpoint states to provide data for each one of N lanes of SIMD execution.

4. The computing system as recited in claim 3, wherein the processor is further configured to halt execution of a given lane of the N lanes in a given pipeline stage, in response to detecting the given lane does not correspond to a minimum program counter of the N lanes in the given pipeline stage.

5. The computing system as recited in claim 3, wherein N-wide vector instructions are not supported by a compiler used to generate the received program code.

6. The computing system as recited in claim 5, wherein the compiler supports generation of M-wide vector instructions, and at least two iterations times M is equal to N.

7. The computing system as recited in claim 3, wherein detecting the region of vectorizable instructions comprises detecting a given indication inserted into the program code.

8. The computing system as recited in claim 2, wherein in response to serially executing the at least two iterations of the vectorized region, the processor is further configured to store the generated checkpoint states in a data structure separate from a simulated memory image.

9. The computing system as recited in claim 8, wherein the processor is further configured to redirect memory accesses to the separate data structure, rather than to the simulation memory image.

10. A method comprising:
    accessing program code, wherein the program code includes one or more instructions that are vectorizable or have been vectorized, wherein a vectorized instruction is a P-wide vector instruction including operands which correspond to P lanes of single-instruction-multiple-data (SIMD) execution; and
    performing a time-based simulation of instructions of the program code;
    suspending execution of the time-based simulation, in response to detecting a region of vectorized or vectorizable instructions in the program code;
    switching to a functional-based simulation of instructions of the program code and serially executing instructions in the region for at least two iterations using a functional-based simulation;
    storing each checkpoint state generated between iterations of the at least two iterations; and
    resuming the time-based simulation, in response to determining no memory dependencies exist within any two iterations of the at least two iterations.

11. The method as recited in claim 10, wherein in response to determining said memory dependencies do not exist, the method further comprises executing instructions of the region using N-wide vector instructions, wherein N >P, as part of the resumed time-based simulation.

12. The method as recited in claim 11, wherein the method further comprises utilizing data corresponding to the generated checkpoint states to provide data for each one of N lanes of SIMD execution.

13. The method as recited in claim 12, wherein the method further comprises halting execution of a given lane of the N lanes in a given pipeline stage, in response to detecting the given lane does not correspond to a minimum program counter of the N lanes in the given pipeline stage.

14. The method as recited in claim 12, wherein the compiler supports generation of M-wide vector instructions, and at least two iterations times M is equal to N.

15. The method as recited in claim 11, wherein in response to serially executing the at least two iterations of the vectorized region, the method further comprises storing the generated checkpoint states in a data structure separate from a simulated memory image.

16. The method as recited in claim 15, wherein, in response to serially executing the at least two iterations of the vectorized region, the method further comprises redirecting memory accesses to the separate data structure, rather than to the simulation memory image.

17. A non-transitory computer readable storage medium storing program instructions operable to efficiently simulate vector instructions, wherein the program instructions are executable by a processor to:
   receive program code, wherein the program code includes one or more instructions that are vectorizable or have been vectorized, wherein a vectorized instruction is a P-wide vector instruction including operands which correspond to P lanes of single-instruction-multiple-data (SIMD) execution; and
   perform a time-based simulation of instructions of the program code;
   suspend execution of the time-based simulation, in response to detecting a region of vectorized or vectorizable instructions in the program code;
   switch to a functional-based simulation of instructions of the program code and serially execute the region for at least two iterations using a functional-based simulation and M-wide vector instructions;
   store each checkpoint state generated between iterations of the at least two iterations; and
   resume the time-based simulation, in response to determining no memory dependencies exist within any two iterations of the at least two iterations.

18. The storage medium as recited in claim 17, wherein in response to determining no memory dependencies exist within any two iterations of the at least two iterations, the program instructions are further executable to execute instructions of the region using N-wide vector instructions, wherein $N > P$, as part of the resumed time-based simulation.

19. The storage medium as recited in claim 18, wherein the program instructions are further executable to utilize data corresponding to the generated checkpoint states to provide data for each one of N lanes of SIMD execution.

20. The storage medium as recited in claim 18, wherein in response to serially executing the at least two iterations of the vectorized region, the program instructions are further executable to store the generated checkpoint states in a data structure separate from a simulated memory image.

* * * * *